US009383252B2

(12) United States Patent  
Feldotte et al.

(10) Patent No.: US 9,383,252 B2  
(45) Date of Patent: Jul. 5, 2016

(54) WINDSHIELD FOR A PRECISION BALANCE

(71) Applicant: SARTORIUS LAB INSTRUMENTS GMBH & CO. KG, Goettingen (DE)

(72) Inventors: Heinrich Feldotte, Goettingen (DE); Winfried Graf, Niemetal (DE); Heyko Holst, Goettingen (DE); Christian Schrader, Bodenfelde (DE)

(73) Assignee: Sartorius Lab Instruments GmbH & Co. KG, Goettingen (DE)

( * ) Notice: Subject to any disclaimer, the term of this patent is extended or adjusted under 35 U.S.C. 154(b) by 273 days.

(21) Appl. No.: 14/028,669

(22) Filed: Sep. 17, 2013

(65) Prior Publication Data

US 2014/0014416 A1    Jan. 16, 2014

Related U.S. Application Data

(63) Continuation of application No. PCT/EP2012/000428, filed on Jan. 31, 2012.

(30) Foreign Application Priority Data

Mar. 17, 2011    (DE) .......................... 10 2011 001 354

(51) Int. Cl.  
*G01G 21/28* (2006.01)  
*G01G 7/06* (2006.01)  
(52) U.S. Cl.  
CPC ................. *G01G 21/286* (2013.01); *G01G 7/06* (2013.01); *G01G 21/28* (2013.01)  
(58) Field of Classification Search  
CPC ... G01G 21/28; G01G 21/283; G01G 21/286; G01G 21/30; G01G 7/06  
See application file for complete search history.

(56) References Cited

U.S. PATENT DOCUMENTS

| | | | | |
|---|---|---|---|---|
| 4,821,821 A | * | 4/1989 | Kelley | G01G 21/30 177/181 |
| 5,345,043 A | * | 9/1994 | Luechinger | G01G 21/286 177/180 |
| 5,627,509 A | * | 5/1997 | Gajewski | B60R 25/1004 200/61.08 |
| 5,648,758 A | * | 7/1997 | Tweadey, II | G08B 13/04 340/426.27 |
| 6,239,360 B1 | | 5/2001 | Kato | |
| 6,965,083 B2 | * | 11/2005 | Reiser | G01G 21/22 177/238 |
| 7,323,645 B2 | * | 1/2008 | Nufer | G01G 23/00 177/180 |
| 9,074,926 B2 | * | 7/2015 | Iizuka | G01G 21/286 |
| 2007/0012488 A1 | * | 1/2007 | Olesen | G01G 21/286 177/180 |
| 2009/0194340 A1 | * | 8/2009 | Mock | G01G 21/286 177/180 |
| 2010/0001602 A1 | * | 1/2010 | Bossaller | H02K 11/0089 310/89 |
| 2010/0206098 A1 | * | 8/2010 | Wilby | G01G 9/00 73/865 |
| 2010/0326743 A1 | * | 12/2010 | Durst | G01G 21/286 177/180 |

FOREIGN PATENT DOCUMENTS

| | | | | |
|---|---|---|---|---|
| CA | 1084072 A1 | * | 8/1980 | ............. G01G 7/045 |
| DE | 19754295 A1 | * | 6/1999 | ............. G08B 13/04 |
| DE | 20 2008 017708 U1 | | 5/2010 | |

OTHER PUBLICATIONS

DE19754295 Machine Translation downloaded Sep. 10, 2015.*  
International Search Report in counterpart International Application No. PCT/EP2012/000428, mailed Apr. 20, 2012.

* cited by examiner

*Primary Examiner* — Peter Macchiarolo  
*Assistant Examiner* — Natalie Huls  
(74) *Attorney, Agent, or Firm* — Edell, Shapiro & Finnan, LLC

(57) ABSTRACT

A precision balance provided with a windshield having at least one wall element (2, 10, 12, 20, 24), which is provided with an electrically conductive coating (62), and having an electrical connection (66) for the coating. An electrical test device (68) is additionally provided, which is integrated into the precision balance and with which it is possible to check whether the coating (62) is connected to the electrical connection (66).

10 Claims, 6 Drawing Sheets

WINDSHIELD FOR A PRECISION BALANCE

The present application is a Bypass Continuation of International Application No. PCT/2012/000428, filed on Jan. 31, 2012, which claims priority from German Patent Application No. 10 2011 001 354.7, filed on Mar. 17, 2011. The contents of these applications are hereby incorporated into the present application by reference in their respective entireties.

FIELD AND BACKGROUND OF THE INVENTION

The invention relates to a precision balance having a windshield which comprises at least one wall element which is provided with an electrically conductive coating and comprising an electrical connector for the coating.

It is known from the prior art in relation to precision balances that the panes of the windshield are conductively coated in order to conduct away any static charges that form, since these can falsify the weighing result.

DE 20 2008 017 708 U1 discloses a precision balance which serves to weigh electrostatically charged goods. In the interests of a precise weighing result, it is necessary for all the wall surfaces in the interior of the weighing chamber of the balance to be kept at the same electrical potential. For this purpose, the wall elements are connected conductively and electrically through an electrically conductive layer to one another and to a housing.

DE 10 2008 008 486 A1 discloses a windshield for a balance wherein some components can be removed without tools in order to be cleaned. However, an electrically conductive coating of components of the windshield is not disclosed in this document.

EP 1 195 585 discloses a motor-powered windshield in which, however, no electrically conductive coating of the panes of the windshield is provided.

U.S. Pat. No. 6,239,360 discloses an electromagnetic screening system which is configured as a coating on a substrate. If the substrate is mounted, for example, on an electrical device, it can be checked with a measuring device whether the coating is earthed.

OBJECTS AND SUMMARY OF THE INVENTION

It is an object of the invention to provide a precision balance of the aforementioned type wherein unnoticed falsification of the weighing result by electrostatic charges can be reliably prevented, particularly if the windshield is removable.

According to one formulation of the invention, in a precision balance of the aforementioned type, an electrical testing device is provided which is integrated into the precision balance and with which it can be tested whether the coating is connected to the electrical connector. Using the testing device, it is possible to test whether the electrically conductive coating of the wall elements is also correctly contacted. It is thus possible to prevent an electrical field building up due to an interrupted contact, and consequently falsifying a measurement or a whole series of measurements without being noticed. Wall elements within the meaning of the application are taken to be all delimitations of the weighing chamber, for example, visually transparent panes, non-transparent walls or the bottom of the weighing chamber.

Preferably, wall elements are provided as a plurality of visually transparent panes, wherein the coatings of the panes are electrically interconnected. This makes it possible, with little effort, even in the case of a windshield consisting of a plurality of panes, to test the correct connection and resultant earthing of all the panes.

According to one embodiment, it is provided that the testing device is able to determine the impedance or the resistance between at least one test contact which contacts the coating, and the electrical connector. The testing contact can be arranged in a technically simple manner at a site that is favorable for the relevant function.

According to a preferred embodiment, it is provided that at least one of the panes is displaceable between a closed position and an open position and that at least one of the testing contacts is arranged so as to engage with the electrically conductive coating only in the closed position of the pane. In this way, a further function can be realized without additional outlay, specifically monitoring of whether the displaceable pane is also closed during a weighing procedure.

Preferably, the resolution of the balance can be reduced by, for example, one decimal place, if it is detected that the displaceable pane is not closed. This enables coarse weighing with the pane open, together with a more stable, faster reading.

According to a preferred embodiment of the invention, it is provided that the windshield is removable and has a plurality of panes and a support frame. The inventive testing of the correct contacting of the electrically conductive coating of the panes is particularly advantageous for a removable windshield because the problem of correct contacting is more acute herein than in the case of a firmly mounted windshield. In the case of a removable windshield, many components are simply pushed into one another during installation. As a result, there is a greater risk than with a firmly mounted windshield that, following removal and subsequent installation, one of the panes of the windshield is not electrically connected. With the inventive testing device, it can be checked automatically after installation and before each weighing procedure whether all the panes are correctly connected again. If not, an error message can be output. This error message can be passed on either to a signal generator for visual or acoustic output of a warning signal or used to influence a process, for example, to interrupt the automatic feeding in of goods to be weighed, in particular in the case of motor-powered windshields. It is also possible to switch off the balance entirely or to enable only operation with reduced resolution so that any electrostatic charge on the panes does not lead to falsified weighing results.

According to another embodiment of the invention, it is provided that the windshield comprises a front pane, a rear pane, a support frame which lies on the front pane and the rear pane, two side panes which are displaceably mounted in the support frame and adjoin the front pane and the rear pane, and a clamping device which presses downwardly in a vertical direction on the support frame. In this way, a windshield is provided which can be removed and installed again with little effort. In the removed state, all the individual parts can be readily cleaned.

According to another embodiment of the invention, it can be provided that at least one electrically conductive contact, for example, an electrically conductive brush, which engages with the electrically conductive coating is mounted on the support frame. This enables reliable contacting even when the relevant pane is displaceable in the support frame.

BRIEF DESCRIPTION OF THE DRAWINGS

The invention will now be described in greater detail with reference to various exemplary embodiments which are illustrated in the accompanying drawings, in which.

DETAILED DESCRIPTION OF EXEMPLARY EMBODIMENTS

Figure 1:
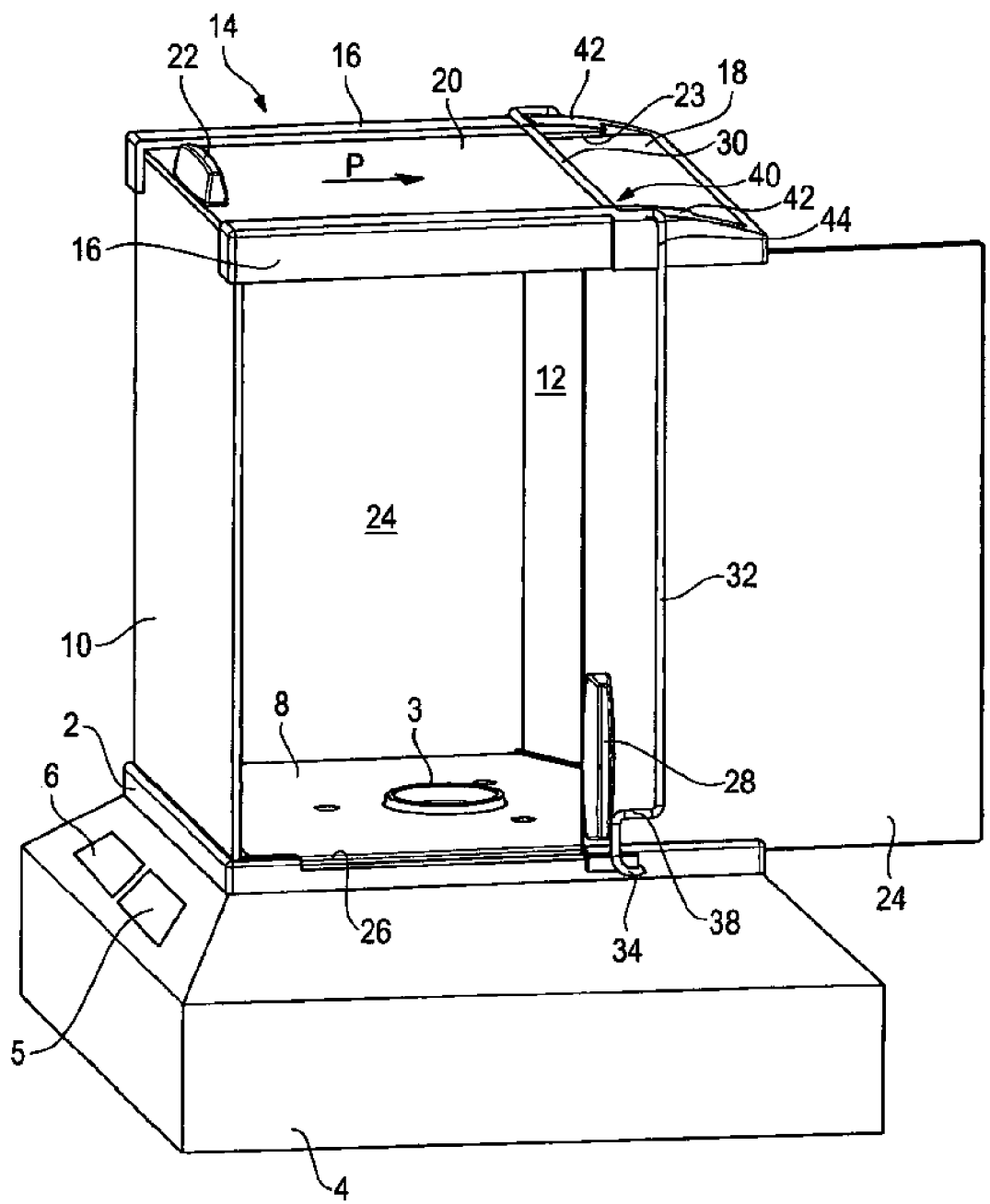
FIG. 1 is a perspective view of a windshield according to a first embodiment.
Figure 2:
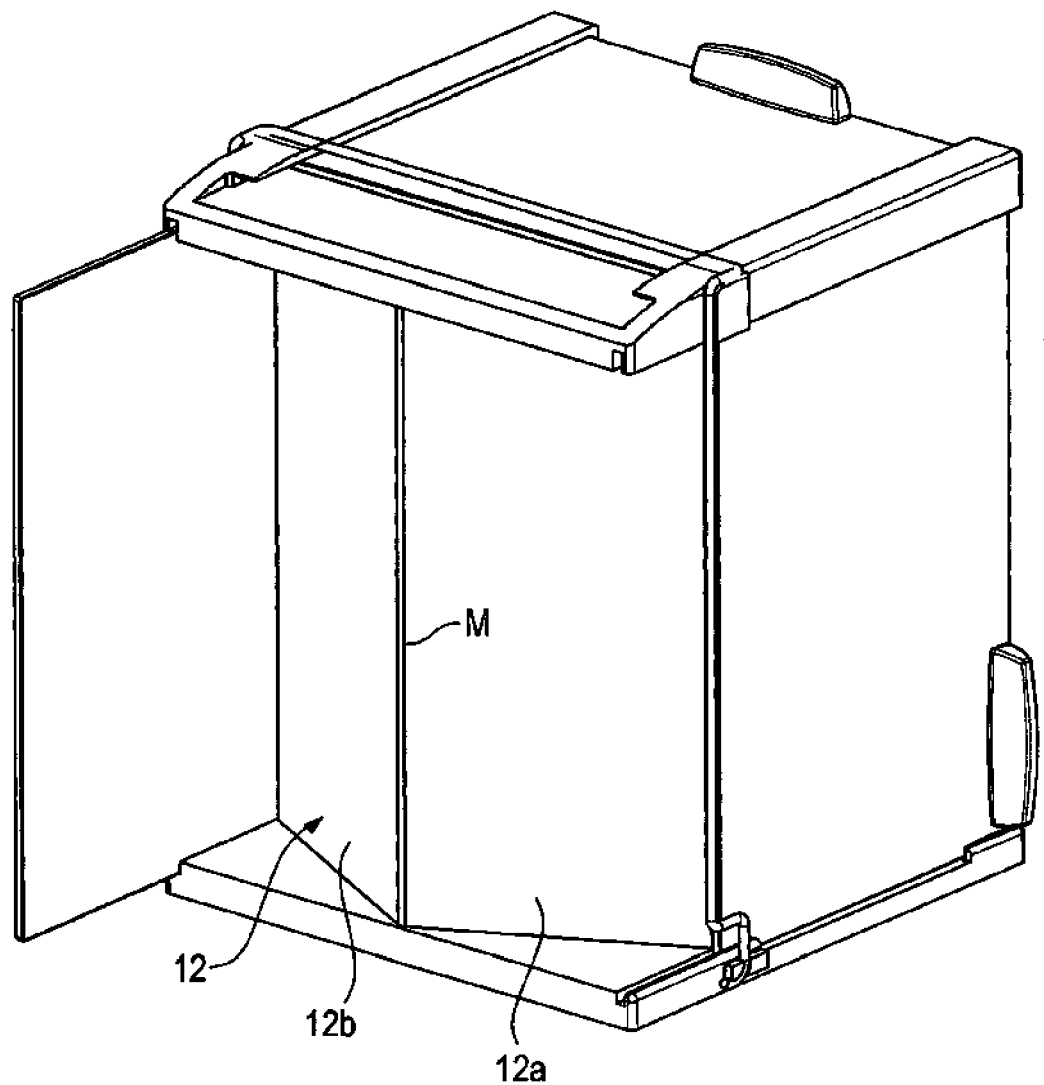
FIG. 2 is the windshield of FIG. 1 in a second perspective view.
Figure 3:
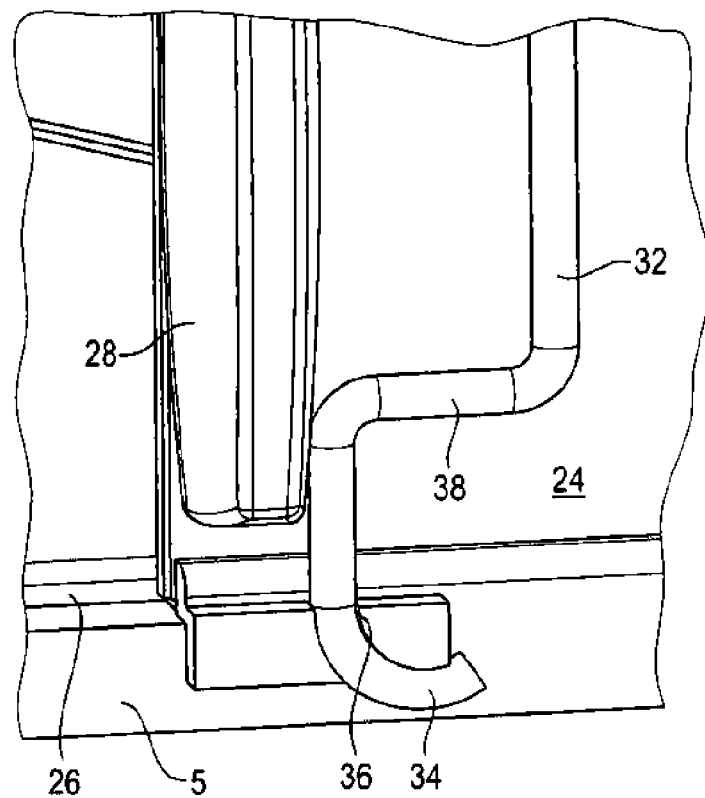
FIG. 3 is the detail III of FIG. 1.
Figure 4:
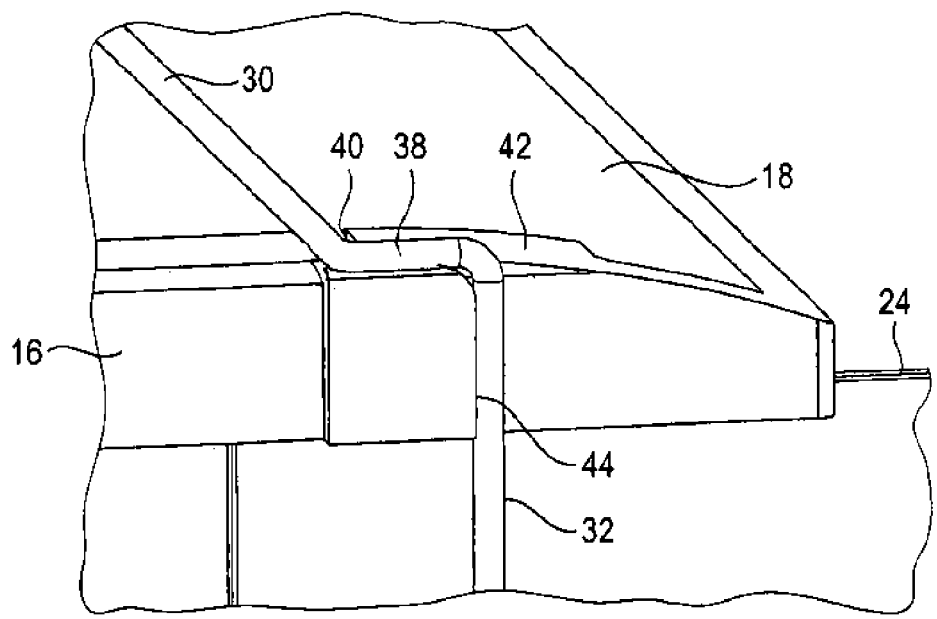
FIG. 4 is the detail IV of FIG. 1.
Figure 5:
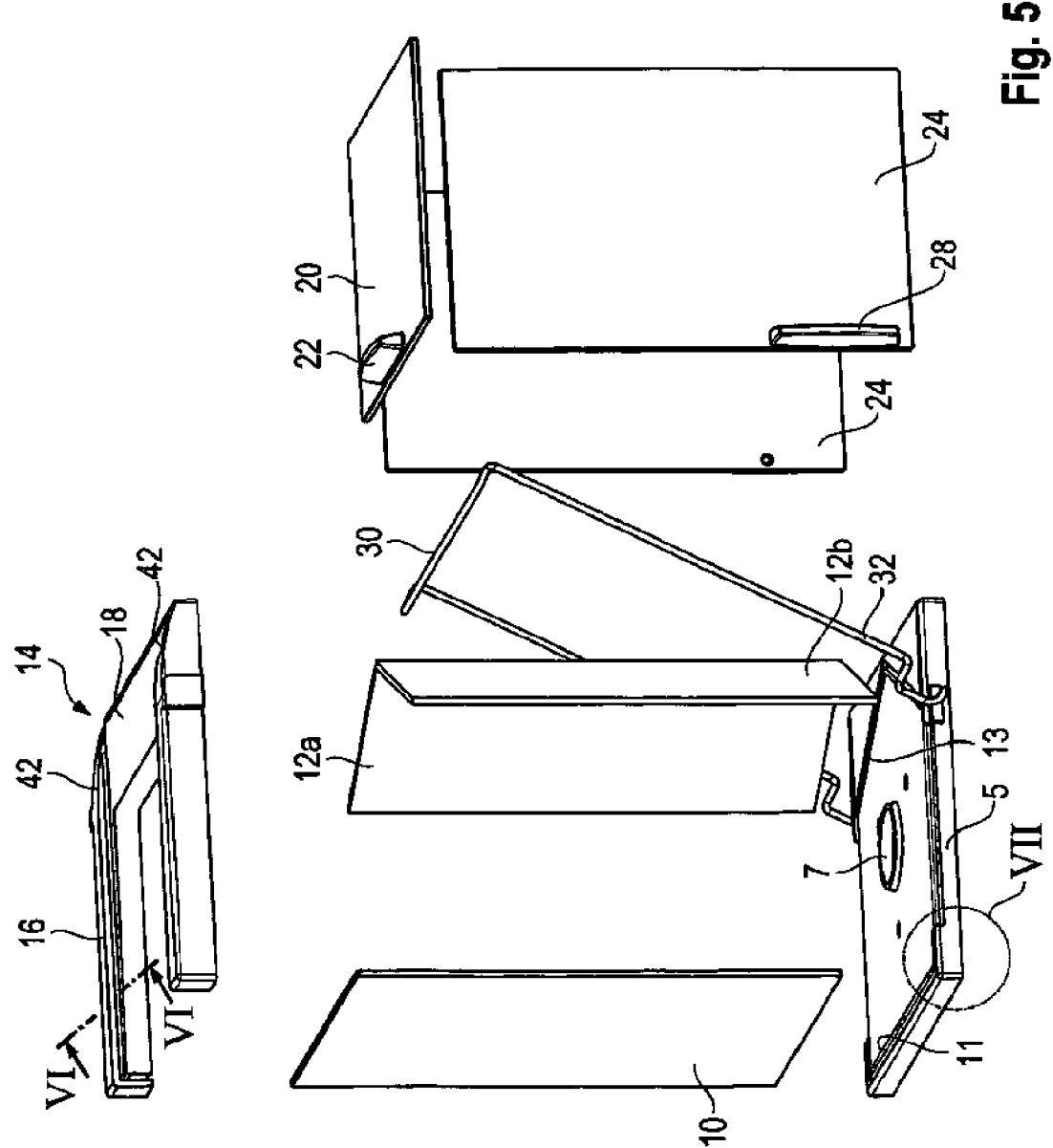
FIG. 5 is the windshield of FIG. 1 in an exploded view.

FIGS. 1 to 5 show a windshield according to one embodiment of the invention, which is actuatable by hand. The windshield is assembled on a base plate 2, which surrounds a passage 3 for a scale pan of a precision balance. The base plate 2 can be a fixed part of a precision balance or an added part which is mounted in a precision balance or not, depending on the preference of the customer. In this embodiment, said base plate comprises a removable conductive weighing chamber base 8. The base plate 2 also comprises a front pane 10, at least one rear pane 12, a movable cover pane 20 and two movable side panes 24. The weighing chamber base 8, the front pane 10, the rear pane 12, the cover pane 20 and the side panes 24 are referred to below as wall elements.

In the embodiment shown, a housing 4 of the precision balance in which the mechanical, electrical and electronic components are accommodated is arranged beneath the base plate 2. Integrated in the housing 4 are a display 5 for the weighing result and an operating panel 6 for operating the various functions of the precision balance.

Arranged on the base plate are a front pane 10 and a rear pane 12. The front pane 10 is rectangular and planar and is inserted with the lower edge thereof into a groove 11 of the base plate 2 (see FIG. 5). The rear pane 12 is constructed from two partial panes 12a, 12b (see, in particular, FIG. 2) which touch one another along a midline M. The angle between the two partial panes 12a, 12b can be in the order of 120°. The distance between the midline M and the plane of the front pane 10 is greater than the distance between the outwardly arranged side edges of the partial panes 12a, 12b. Otherwise expressed, the rear pane 12, seen from the passage 3 for the scale pan, is configured concave. The two partial panes 12a, 12b are also accommodated in the base plate in a groove 13. The grooves 11, 13 for the front pane 10 and the two partial panes 12a, 12b of the rear pane 12 are adapted to the thickness of the panes such that the panes can preferably be inserted therein without play.

A support frame 14 which consists of two longitudinal struts 16 arranged parallel to one another and a transverse strut 18 arranged transversely thereto is placed on the front pane 10 and the rear pane 12. The two longitudinal struts 16 extend from the front pane 10 to the rear pane 12. Provided in the region of the front pane 10 at the end of each longitudinal strut 16 is a plug-in receptacle into which the upper outer edge section of the front pane 10 can be inserted. A plug-in receptacle is provided in the region of the transverse strut 18 for the upper edge of the two partial panes 12a, 12b.

Arranged between the two longitudinal struts is a cover pane 20 which can be displaced in two sliding grooves 23 relative to the support frame 14 starting from the closed position shown in FIG. 1 in the direction of the arrow P toward an open position. In order to simplify actuation of the cover pane 20, a handle 22 is provided which is arranged here at the edge of the cover pane 20 facing toward the front pane 12. Side panes 24 which are displaceable are arranged at the two longitudinal sides of the windshield. For this purpose, provided in the base plate 2 for each side pane 24 is a sliding groove 26 in which the corresponding side pane 24 is displaceable between a closed position in which said pane lies against the front pane 10, and an open position (see FIGS. 1 and 2). Similarly to the cover pane 20, a handle 28 which facilitates the displacement is provided at each side pane 24. In order to guide the side panes 24, two sliding grooves for the side panes are also provided at the support frame 14, specifically in the underside of the two longitudinal struts 16.

In order to lock the support frame 14 to the panes of the windshield, a clamping device is provided which here is configured as a clamping bracket with a central section 30 and two side limbs 32. Each side limb is provided with a bent-over end section 34 which can be hooked into a curved support groove 36 which is provided at the base plate 2. The clamping bracket is also provided with a tolerance equalization unit in the form of two right-angle bent spring sections 38 of which one is arranged close to the bent-over end section 34 (see, in particular, FIG. 3) and the other is arranged in the region of the transition from the side limb 32 to the central section 30. In order to lock the clamping bracket to the support frame 14, said support frame is provided at the top side thereof with two locking grooves 40 which are formed in the region of the transition from the transverse strut 18 to the two longitudinal struts 16.

The windshield can be assembled very easily and rapidly without any tools. Initially, the front pane 10 and the two partial panes 12a, 12b are placed on the base plate 2. The support frame 14 into which the cover pane 20 can be inserted is then installed. The two side panes 24 are also inserted. Finally, the clamping device is installed, the device being initially threaded obliquely with the two end sections 34 thereof into the two mounting grooves 36 (see FIG. 5). Then the clamping device is pivoted upwardly onto the support frame 14. Said clamping device slides over obliquely arranged guide surfaces 42, while the spring sections 38 are elastically pre-tensioned until the central section 30 finally snaps into the locking groove 40. At the same time, the side limbs come to rest against stops 44 at the support frame. In this way, a mechanically stable system is obtained wherein the support frame 14 lies at a location between the mid-line M and the front pane 10 and is impinged upon elastically downwardly in the vertical direction toward the base plate 2. The clamping bracket is arranged so as to serve as a stop for the handles 22, 28.

The side panes 24 and the sliding grooves provided for the guidance thereof are dimensioned such that the clamping effect exerted by the clamping bracket in the vertical direction is absorbed by the front pane 10 and the rear pane 12 and the side panes 24 can be displaced essentially friction-free between the base plate 2 and the support frame 14.

The front pane 10, the rear pane 12, the cover pane 20 and the side panes 24 consist of glass or transparent plastics, wherein in the case of plastics, care must be taken that this material is sufficiently resistant to common cleaning agents. The support frame 14 can be made of plastics and the clamping bracket with the central section 30 thereof and the side limbs 32 are preferably made of metal. All the components can easily be disassembled again and then cleaned by placing said components in, for example, an industrial washing machine.

Figure 6:
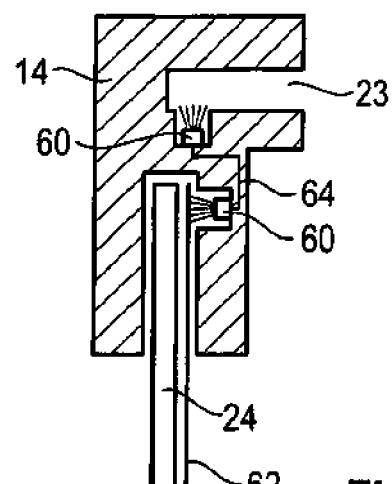
FIG. 6 is a section along the plane VI-VI of FIG. 5.
Figure 8:
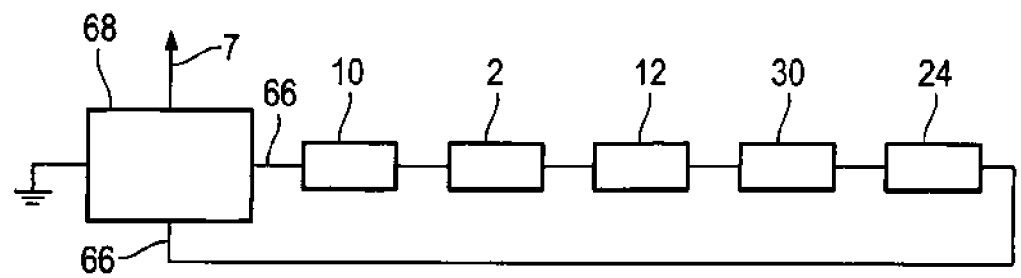
FIG. 8 is a schematic equivalent circuit diagram of a series connection for the testing device.
Figure 9:
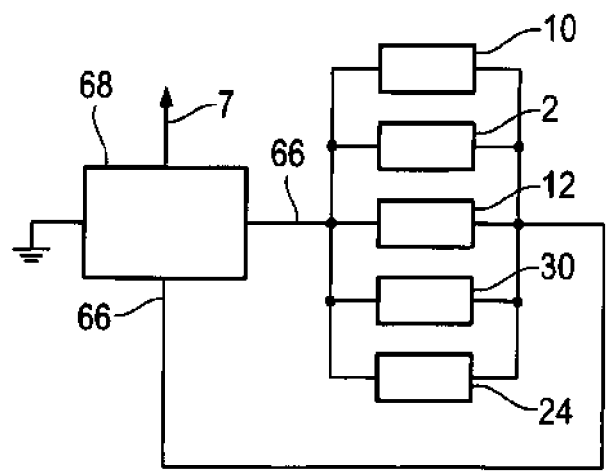
FIG. 9 is a schematic equivalent circuit diagram of a parallel connection for the testing device.

Each of the wall elements 8, 10, 12, 20, 24 of the windshield is provided with an electrically conductive coating and all the wall elements are electrically conductively connected to one another. This connection can be made either in parallel or in series (see the equivalent circuit diagrams in FIGS. 8 and 9). Contacting of the electrical coatings of the wall elements is achieved with small brushes 60, for example, carbon fiber brushes which are mounted at suitable sites along the guideways for the movable wall elements. FIG. 6 shows, by way of example, two brushes 60, of which one is arranged at the edge of the sliding groove 23 for the wall element 20 and the other is arranged at the edge of the sliding guideway for the wall elements 24. FIG. 6 also shows, schematically, an electrically conductive coating 62 at the wall element 24 with which the brush 60 engages. Also shown is an electrical conductor 64 which electrically connects the two brushes to one another. In this way, an electrical connection of all the wall elements can be created.

Figure 7:
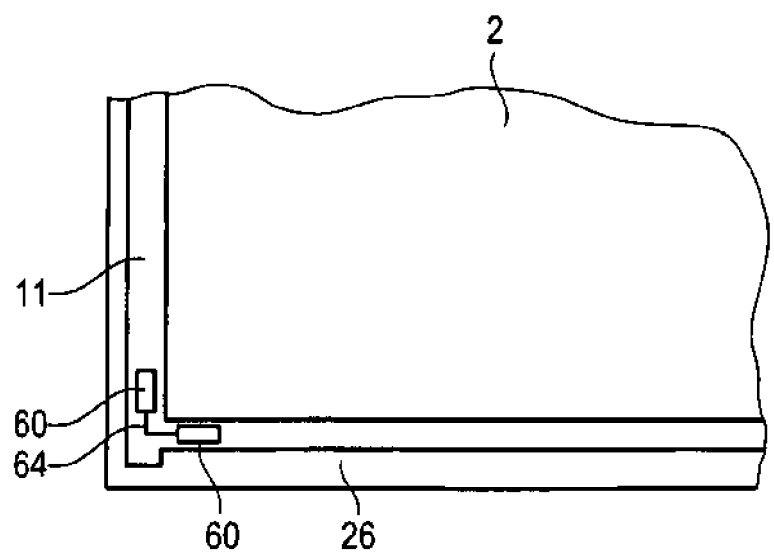
FIG. 7 is a section along the plane VII-VII of FIG. 5.

FIG. 7 shows that the brush 60 which is arranged in the sliding groove 26 for the wall element 24 is arranged at the end of the corresponding sliding groove, specifically at the end at which the edge of the wall element 24 provided with the handle 28 is located when the wall element 24 is fully closed. This has the result that a continuous electrical contact through all the wall elements is created only when the wall elements 24 are located in the closed positions thereof. Similar monitoring can also be carried out for the wall element 20 in that the contacting of the electrically conductive coating is provided there at one site which is reached only with the wall element 20 closed.

The electrically conductive coatings 62 are connected to one another and are linked via the contacts 66 to the testing device 68. The electrical testing device 68 is integrated into the precision balance and checks whether all the electrically conductive coatings are correctly contacted. This can be achieved, in particular, with an impedance or resistance measurement. If it is detected that at least one coating of a wall element is not contacted, the testing device 68 can provide a warning message or a signal via the output 7 in order to influence a subordinate process, for example, the interruption of automatic feeding-in of goods to be weighed. In this way, the operator is prompted to check the windshield to discover where the contact chain could have been interrupted. At the same time, the testing device 68 can switch off the balance entirely or can permit only restricted operation.

Furthermore, the testing device 68 can be switched off so as to recognize whether all the wall elements of the windshield are closed. If the testing device detects that one of the wall elements is open then, for example, the resolution of the display 5 can be reduced, for example, by a power of ten, so that with the wall element open, a coarse weighing process can be undertaken with a stable display, whilst the precise weighing result can only be read with the wall element closed.

It is also possible to provide one brush which always makes contact with the corresponding wall element and a second which serves only to detect whether the wall element is in the closed position. In this case, the testing device must monitor a series connection of the wall elements and also check the brush which serves to detect the closed position.

The above description of various embodiments has been given by way of example. From the disclosure given, those skilled in the art will not only understand the present invention and its attendant advantages, but will also find apparent various changes and modifications to the structures and methods disclosed. The applicant seeks to cover all such changes and modifications as fall within the scope of the invention, as originally disclosed and defined by the appended claims.

The invention claimed is:

1. A precision balance comprising:
   a windshield which comprises at least one wall element provided with an electrically conductive coating,
   a support frame that supports the windshield in either an electrically connected position or in a faulty position in which the windshield is not electrically connected to the support frame,
   an electrical connector affixed to the support frame and arranged to electrically connect to the coating in the electrically connected position but not in the faulty position, and
   an electrical testing device which is integrated into the precision balance and which is configured to test whether the coating is electrically connected to the electrical connector.

2. The precision balance as claimed in claim 1, further comprising further wall elements, each provided with a respective further electrically conductive coating, wherein the coatings of the wall elements are electrically connected in series.

3. The precision balance as claimed in claim 1, further comprising further wall elements, each provided with a respective further electrically conductive coating, wherein the coatings of the wall elements are electrically connected in parallel.

4. The precision balance as claimed in claim 1, wherein, absent an electrical connection between the coating of the at least one wall element and the electrical connector, the electrical testing device emits a signal to output an optical warning signal, output an acoustic warning signal, and/or interrupt a subsidiary process of the precision balance.

5. The precision balance as claimed in claim 1, wherein the testing device is configured to determine an electrical resistance between at least one test contact, of the electrical connector and the electrically conductive coating.

6. The precision balance as claimed in claim 5, wherein the at least one wall element is slidingly displaceable between a closed position and an open position, and the at least one test contact is arranged to engage with the electrically conductive coating only in the closed position of the wall element.

7. The precision balance as claimed in claim 6, wherein detection of the open position of the displaceable wall element reduces an operative resolution of the balance.

8. The precision balance as claimed in claim 1, wherein the wall element is removably supported in the support frame.

9. The precision balance as claimed in claim 8, wherein the windshield comprises a front pane, a rear pane, two side panes which are displaceably mounted in the support frame and adjoin the front pane and the rear pane, and a clamping device which presses downwardly in a vertical direction on the support frame.

10. The precision balance as claimed in claim 8, wherein the electrical connector comprises at least one electrically conductive brush, which is configured to engage with the electrically conductive coating, and which is mounted on the support frame.

* * * * *